(12) United States Patent
Lee (10) Patent No.: US 9,387,828 B2
(45) Date of Patent: Jul. 12, 2016

(54) ADAPTER FOR WINDSHIELD WIPER ASSEMBLY

(71) Applicant: ALBEREE PRODUCTS, INC., Halethorpe, MD (US)

(72) Inventor: Albert Lee, Halethorpe, MD (US)

(73) Assignee: ALBEREE PRODUCTS, INC., Halethorpe, MD (US)

( * ) Notice: Subject to any disclaimer, the term of this patent is extended or adjusted under 35 U.S.C. 154(b) by 397 days.

(21) Appl. No.: 13/731,828

(22) Filed: Dec. 31, 2012

(65) Prior Publication Data

US 2013/0212825 A1  Aug. 22, 2013

Related U.S. Application Data

(60) Provisional application No. 61/581,573, filed on Dec. 29, 2011.

(51) Int. Cl.
*B60S 1/40* (2006.01)
*B60S 1/38* (2006.01)

(52) U.S. Cl.
CPC ............... *B60S 1/40* (2013.01); *B60S 1/3867* (2013.01); *B60S 1/407* (2013.01); *B60S 1/4074* (2013.01); *B60S 1/4077* (2013.01)

(58) Field of Classification Search
CPC ........ B60S 1/40; B60S 1/3853; B60S 1/3867; B60S 1/4067; B60S 1/407; B60S 1/4077; B60S 1/4074; B60S 2001/408
See application file for complete search history.

(56) References Cited

U.S. PATENT DOCUMENTS

| | | | | |
|---|---|---|---|---|
| 4,949,422 A * | 8/1990 | Bauer et al. | ................. | 15/250.32 |
| 2006/0021179 A1* | 2/2006 | Yang et al. | ................. | 15/250.32 |
| 2010/0186184 A1* | 7/2010 | Lee | .............. | 15/250.32 |
| 2013/0185889 A1* | 7/2013 | Tolentino et al. | .......... | 15/250.32 |

\* cited by examiner

*Primary Examiner* — Gary Graham
(74) *Attorney, Agent, or Firm* — Birch, Stewart, Kolasch & Birch, LLP

(57) ABSTRACT

An adapter for a windshield wiper assembly includes a head having a sloping portion, and a body connected to the head, the body including a pommel that contacts the head, a notch formed in the body adjacent the pommel, a back extending away from the notch, and a recess formed under the back. The head is narrower in width than the body, and longer in length than the body.

18 Claims, 9 Drawing Sheets

ADAPTER FOR WINDSHIELD WIPER ASSEMBLY

CROSS REFERENCE TO RELATED APPLICATION

This application claims the benefit of U.S. Provisional Application No. 61/581,573 filed on Dec. 29, 2011, the disclosure of which is incorporated by reference.

BACKGROUND OF THE INVENTION

1. Field of the Invention

Embodiments of the invention are directed to adapters for a windshield wiper assembly. More particularly, the embodiments of the invention are directed to adapters configured to cooperate with one or more windshield wiper arm designs of a windshield wiper assembly.

2. Discussion of the Related Art

Various types of windshield wiper arms are available which utilize respective adapters for connection of windshield wiper assemblies to the windshield wiper arms, respectively. Thus, a particular adapter may be usable with a particular type of windshield wiper arm.

SUMMARY OF THE INVENTION

Accordingly, it is an object of the invention to provide adapters usable with different windshield wiper arms of windshield wiper assemblies.

According to an embodiment of the present invention, an adapter for a windshield wiper assembly includes a head having a sloping portion, and a body connected to the head, the body including a pommel that contacts the head, a notch formed in the body adjacent the pommel, a back extending away from the notch, and a recess formed under the back. The head is narrower in width than the body, and longer in length than the body.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Hereinafter, example embodiments of this invention will be described in detail with reference to FIGS. 1-9. Like reference numerals designate like elements throughout the specification.

Figure 1:
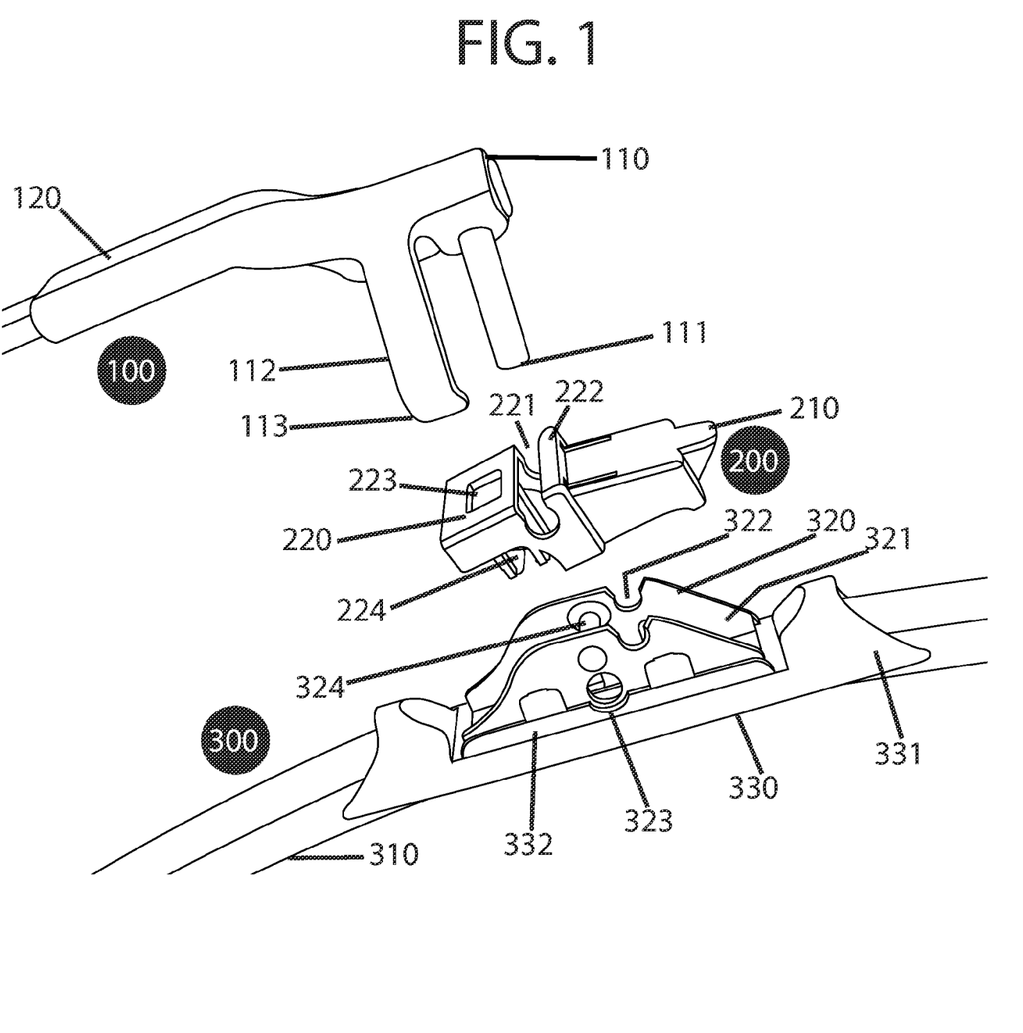
FIG. 1 shows a windshield wiper blade with a bracket, an adapter, and a wiper arm in a detached configuration.
Figure 2:
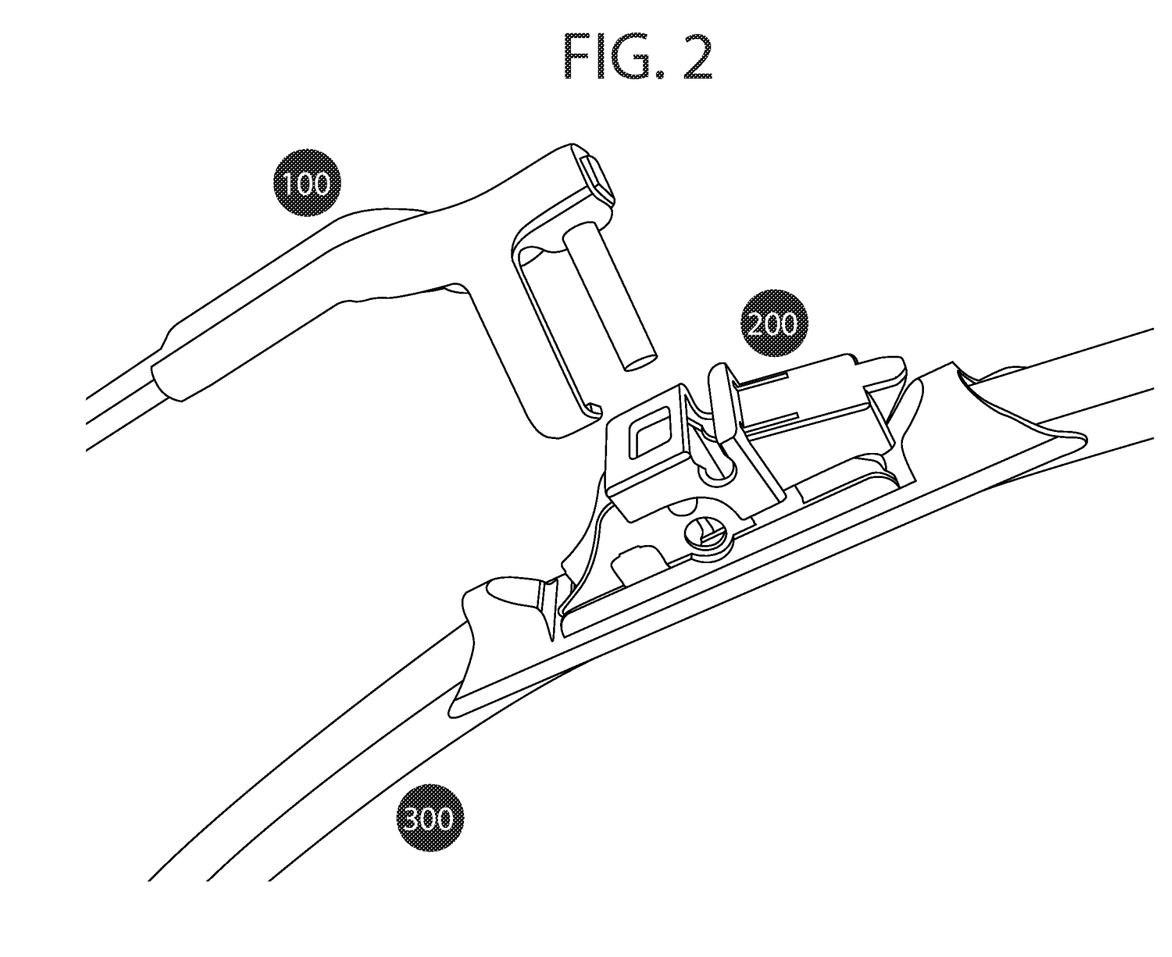
FIG. 2 shows the adapter in an attached configuration to the bracket.
Figure 3:
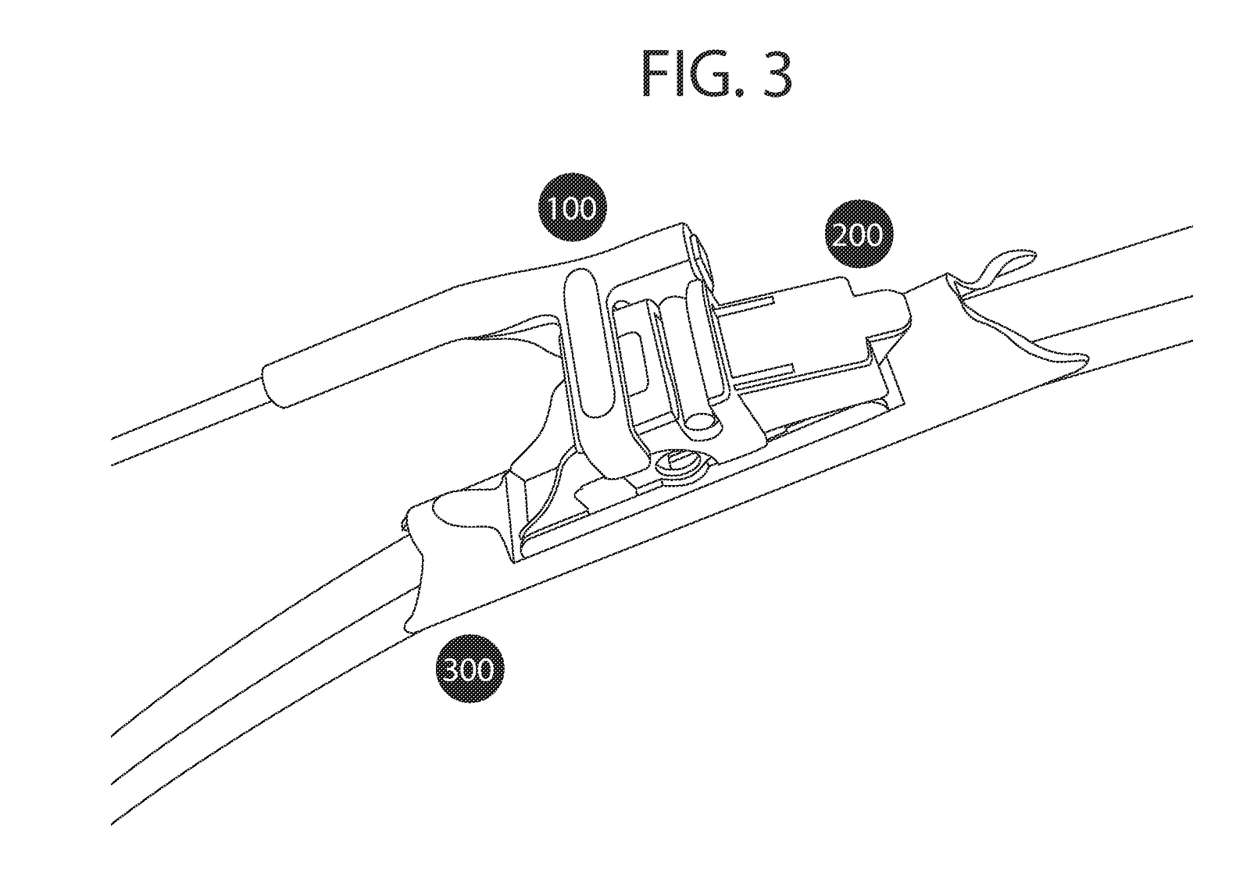
FIG. 3 shows the windshield wiper blade with the bracket, the adapter, and the wiper arm in an attached configuration.
Figure 4:
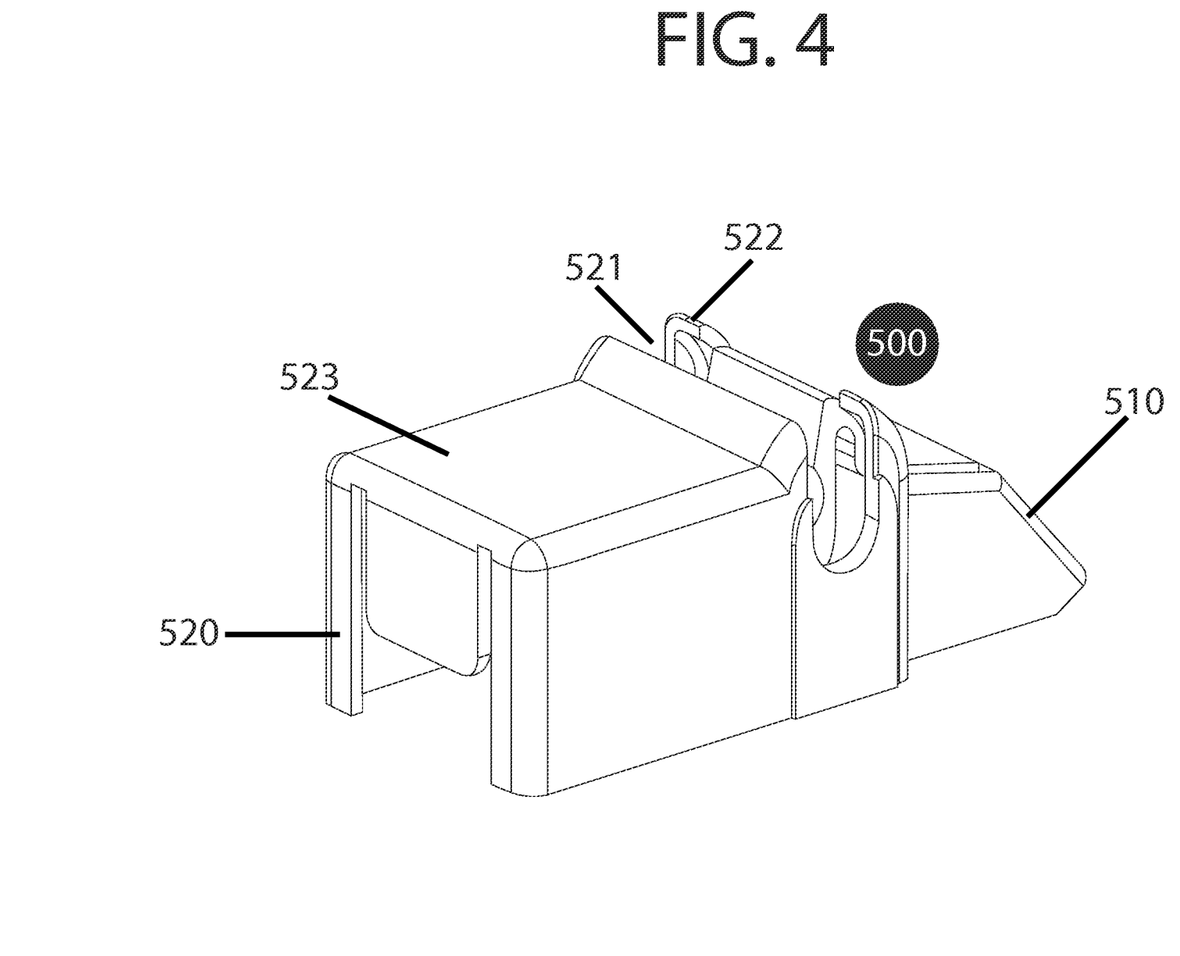
FIG. 4 is a perspective view of the adapter from one angle.
Figure 5:
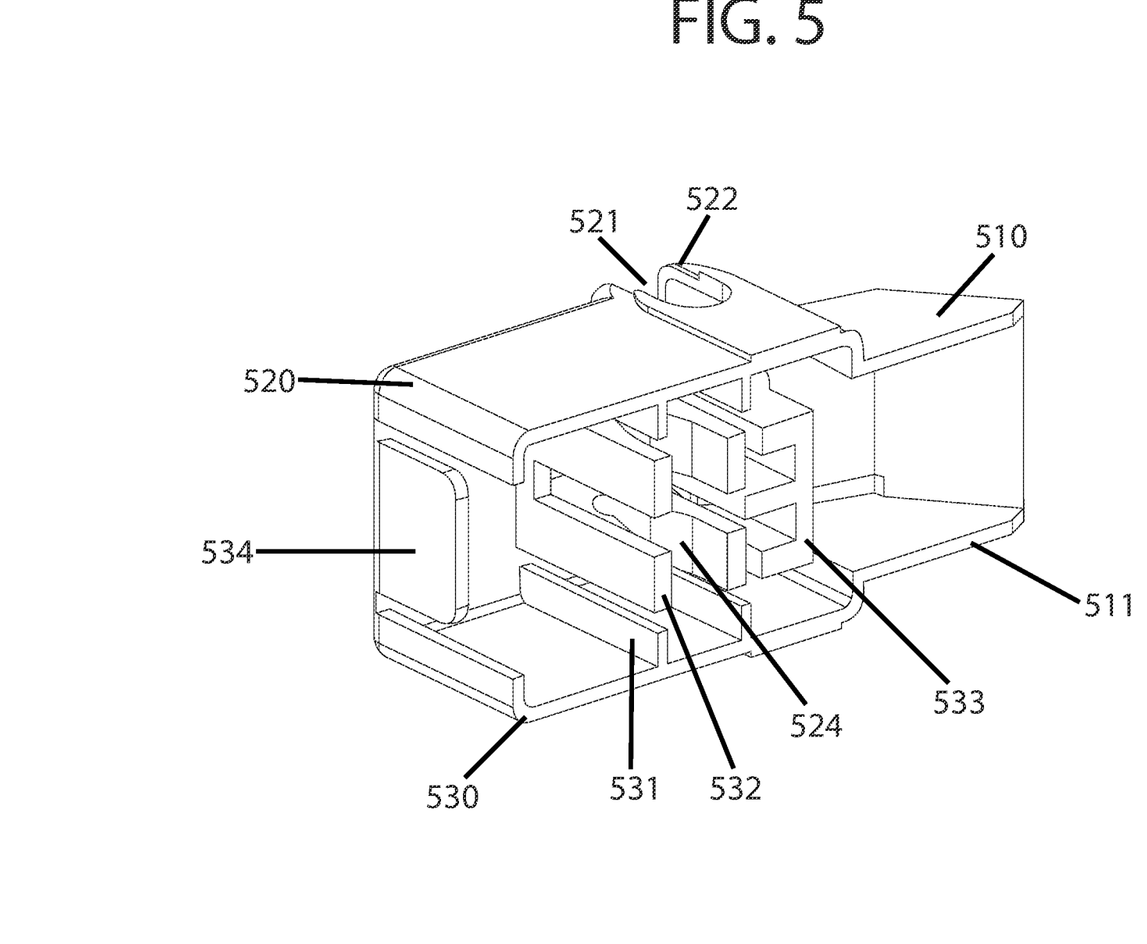
FIG. 5 is a bottom perspective view of the adapter.
Figure 6:
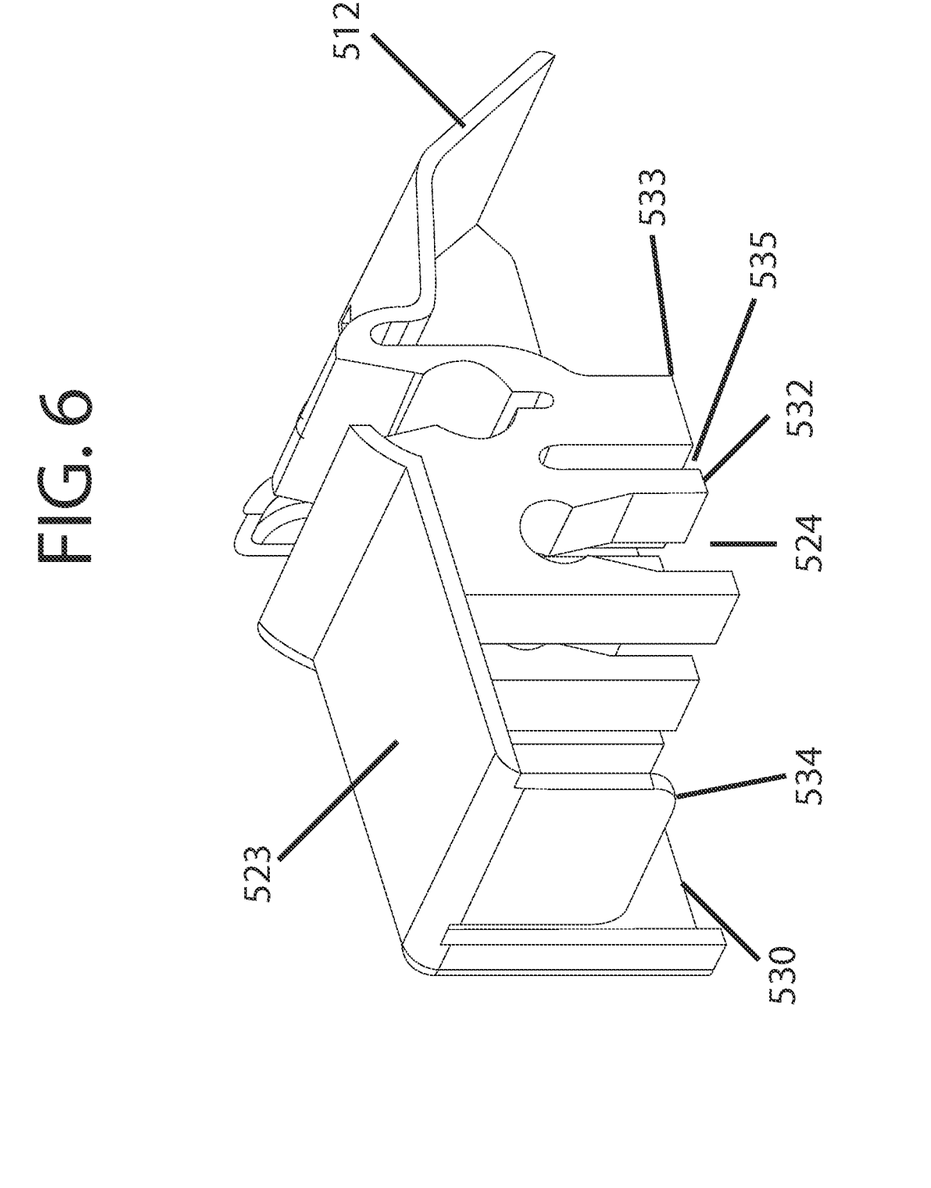
FIG. 6 is a cross sectional view of the adapter.
Figure 7:
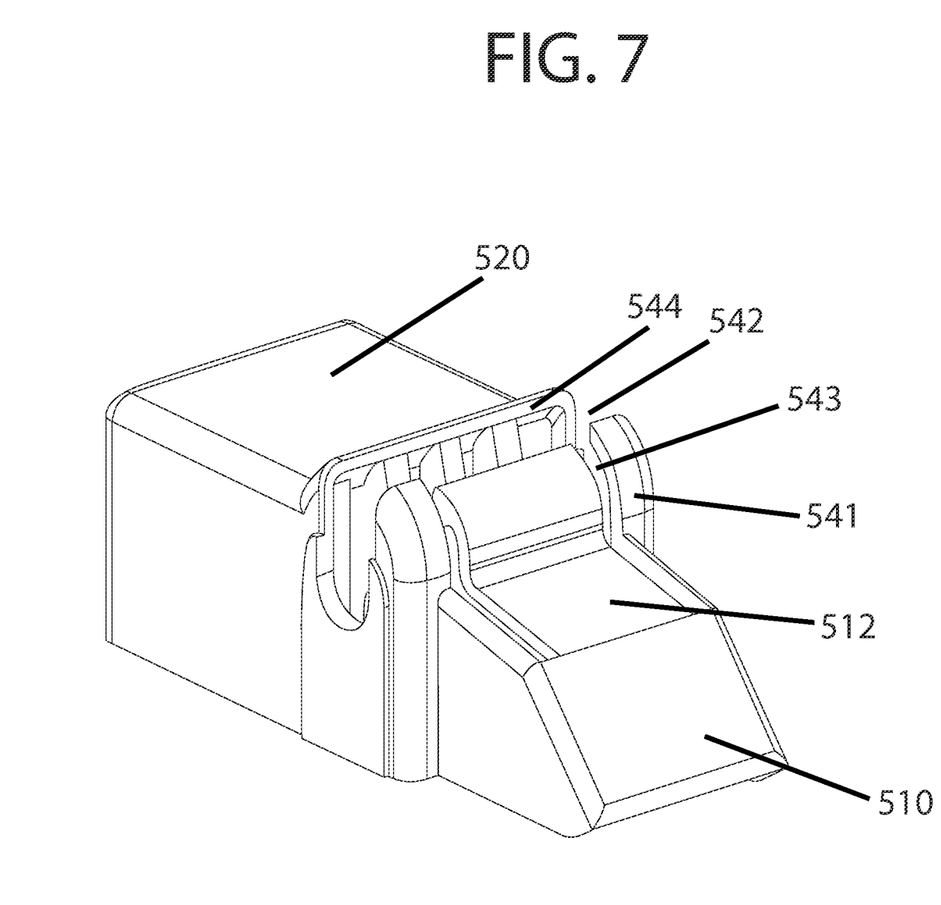
FIG. 7 is a perspective view of the adapter from another angle.
Figure 8:
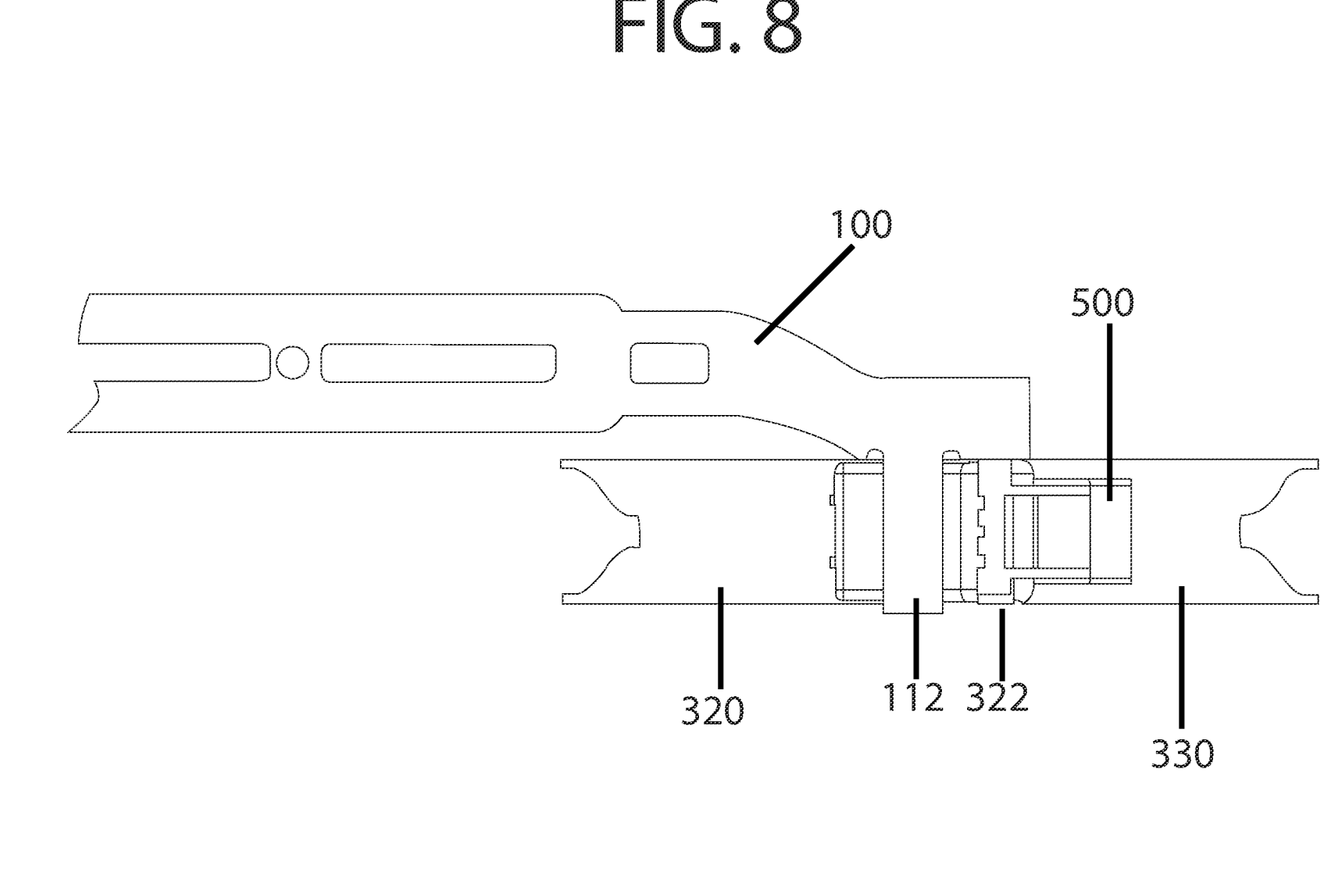
FIG. 8 is a plan view of the windshield wiper blade with the bracket, the adapter, and the wiper arm in the attached configuration.
Figure 9:
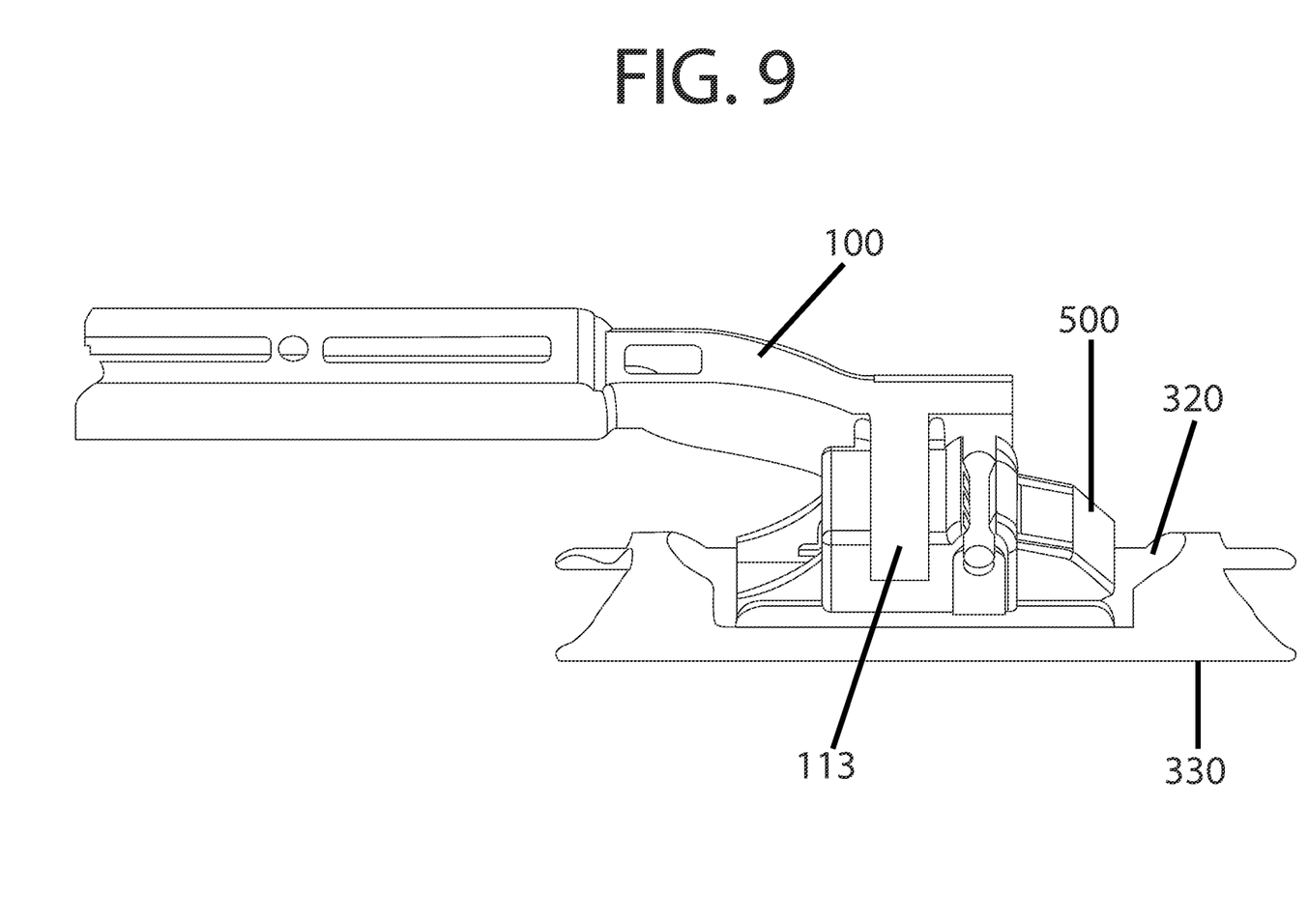
FIG. 9 is a perspective view of the windshield wiper blade with the bracket, the adapter, and the wiper arm in the attached configuration.

FIG. 1 shows the windshield wiper blade with a bracket, the adapter, and the wiper arm in a detached configuration. FIG. 2 shows the adapter in an attached configuration to the bracket. FIG. 3 shows the windshield wiper blade with the bracket, the adapter, and the wiper arm in an attached configuration. A slot in the bracket and a slot in the adapter are aligned, and nested to accommodate the pin of the wiper arm. FIG. 4 is a perspective view of the adapter from one angle. FIG. 5 is a bottom perspective view of the adapter. FIG. 6 is a cross sectional view of the adapter. FIG. 7 is a perspective view of the adapter from another angle. FIG. 8 is a plan view of the windshield wiper blade with the bracket, the adapter, and the wiper arm in the attached configuration. FIG. 9 is a perspective view of the windshield wiper blade with the bracket, the adapter, and the wiper aim in the attached configuration.

In FIG. 1, shown are a windshield wiper arm 100, an adapter 200, and a windshield wiper blade 300. When each of the windshield wiper arm 100, the adapter 200, and the windshield wiper blade 300 are used together, a joined configuration thereof may be referred to as a windshield wiper assembly.

As shown in FIG. 1, the windshield wiper arm 100 includes a head portion 110 including a rod 111 and an extension plate 112. In the embodiment of the invention shown in FIG. 1, the rod 111 and the extension plate 112 are disposed parallel to each other, and each extend away from the head portion 110. While the rod 111 is shown as having a circular cross section, embodiments of the invention are not limited thereto, and the rod 111 may have an oval cross section or other cross sectional shape. Additionally, while the extension plate 112 is shown as an elongated plate or a tongue, embodiments of the invention are not limited thereto, and the extension plate 112 may have other shapes. The extension plate 112 is connected to a platelet 113 that extends perpendicular to an extension direction of the extension plate 112. In embodiments of the invention, the platelet 113 has about the same width and thickness at those of the extension plate 112.

Connected to the head portion 110 is an arm portion 120 that extends away from the head portion 110. The arm portion 120 generally extends perpendicular to the rod 111 and the extension plate 112. Additionally, the arm portion 120 extends perpendicular to both the extension plate 112 and the platelet 113.

As shown in FIG. 1, the adapter 200 includes a head 210 and a body 220. The head 210 and the body 220 are connected, whereby the head 210 is generally narrower than the body 220. The body 220 includes a notch 221, a pommel 222, a back 223, and a recess 224. The head 210 is longer than the body 220. The head 210 has a sloping portion that extends away from the body 220.

The notch 221 extends laterally from one side to an opposite side of the body 220, and is disposed between the pommel 222 and the back 223. The extending direction of the notch 221 intersects an axis that extends from the head 210 to the body 220. In one embodiment of the invention, the notch 221 extends perpendicular to the axis of the head 210 and the body 220. In terms of depth, the notch 221 extends from a first surface of the body 220 to about a middle portion of the body 220. The notch 221 has a somewhat cylindrical outline, especially in the middle portion of the body 220. Accordingly, the notch 221 is open to the first surface of the body 220.

A pommel 222 extends laterally from the one side to the opposite side of the body 220, and is disposed between the notch 221 and the head 210. The extending direction of the pommel 222 intersects the axis that extends from the head 210 to the body 220. In one embodiment of the invention, the notch 221 extends perpendicular to the axis of the head 210 and the body 220. In terms of height, the pommel 222 extends away from the body 220, and in terms of shape, the pommel 222 has a somewhat rectangular cross section and outline. The pommel 222 extends parallel to the notch 221, and faces the back 223 across an opening of the notch 221. In embodiments of the invention, a length of the pommel 222 is the same as a length of the notch 221, is open to the first surface of the body 220.

In FIG. 1, shown is an indentation in the back 223, but such is not required, and the back 223 may simply have a flat surface.

The recess 224 extends laterally from the one side to the opposite side of the body 220, and is disposed between an end of the back 223 and the notch 221. The extending direction of the recess 224 intersects the axis that extends from the head 210 to the body 220. In one embodiment of the invention, the recess 224 extends perpendicular to the axis of the head 210 and the body 220. In terms of depth, the recess 224 extends from a bottom of the body 220 to about the middle portion of the body 220. The recess 224 has a somewhat cylindrical outline, especially in the middle portion of the body 220. Accordingly, the recess is open to the bottom of the body 220. The first surface and the bottom of the body 220 are opposite surfaces. In embodiments of the invention, the notch 221 and the recess 224 are offset on opposite sides of the adapter.

As shown in FIG. 1, the windshield wiper blade 300 includes a blade portion 310, a bracket 320, and a connector 330. The blade portion 310 is composed of a body, a blade for contacting a windshield, and a spoiler that is connected to the body.

The bracket 320 includes a pair of walls 321 that extends upward from the blade portion 310. Each wall 321 is a thin plate having a cutout notch 322, and a hole 323. The bracket 320 also includes a pole 324 that extends between the pair of walls 321.

The pair of walls 321 are spaced apart from each other, and are parallel. The pair of cutout notches 322 are aligned laterally and have opened upper portions, but rounded lower portions. In terms of depth, cutout notches 322 extend from the top of the bracket 320 to about a middle portion of the bracket 320. The pair of walls 321 also include the pair of holes 323 that are aligned laterally and have circular shapes. Above the pair of holes 323 is the pole 324 that extends between the pair of walls 321. The pole 324 extends laterally from one side wall to an opposite side wall of the bracket 320, and is disposed between the top of the bracket 320 and the pair of holes 323. In embodiments of the invention, the pole 324 is cylindrical, but such is not required, and a cross section of the pole 324 may be any shape, including a triangle, a rectangle or an oval. Also, a bottom of the bracket 320 is attached to the blade portion 310.

The connector 330 is disposed between the bracket 320 and the blade portion 310. The connector 330 includes a pair of flanges 331, and a center body 332 that connects each of the flanges 331.

FIG. 2 shows the adapter 200 in an attached configuration to the bracket 320. As shown in FIG. 2, the adapter 200 fits over the bracket 320. In such a configuration, the bracket 320 is received into the adapter 200. In the attached configuration of the adapter 200 and the bracket 320, the pole 324 of the bracket 320 fits into the recess 224 of the adapter 200 snugly, and the cutout notch 322 of the bracket 320 is aligned and nested with the notch 221 of the adapter 200, so that the combined cutout notches 322 and the notch 221 are able to receive and accommodate the rod 111 of the windshield wiper arm 100.

FIG. 3 shows the windshield wiper blade 300 with the bracket 320, the adapter 200, and the windshield wiper arm 100 in an attached configuration. In such a configuration, the cutout notch 322 in the bracket 320 and the notch 221 in the adapter 200 are aligned and nested to receive and accommodate the rod 111 of the windshield wiper arm 100. Accordingly, the rod 111 is fitted snugly in the notch 221 of the adapter 200, and between the pommel 222 and the back 223, and the cutout notches 322 of the bracket 320 further participates in accommodating the rod 111 of the windshield wiper arm 100. For example, the cutout notches 322 engage the rod 111 at opposites ends of the rod 111.

In the configuration shown in FIG. 3, the rod 111 is encased entirely within the cutout notch 322 and notch 221 combination, whereby the exposed surface of the rod 111 do not extend beyond an imaginary line extending from a top of the pommel 222 to the top surface of the back 223. Additionally, in the configuration shown in FIG. 3, the extension plate 112 of the windshield wiper arm 100 extends across the top surface of the back 223, and the platelet 113 is contacted to a lateral side of the adapter 200. Accordingly, the adapter 200 is made to fit between the platelet 113 and the head portion 110. In the embodiment of the invention shown in FIG. 3, the extension plate 112 is placed over the indentation in the back 223.

FIGS. 4 and 5 are perspective views of an adapter according to another embodiment of the invention. The adapter 500 includes a head 510 and a body 520. The head 510 and the body 520 are connected, whereby the head 510 is generally narrower than the body 520. The body 520 includes a notch 521, a pommel 522, a back 523, and a recess 524. FIG. 5 further shows the head 510 as including a head wall 511, and the body 520 as including a body wall 530, wall flanges 531, recess flanges 532, notch flanges 533, and a tail 534. The body wall 530 acts as a casing that gives form to the body 520, and supports the wall flanges 531 that extend perpendicularly away from the body wall 530. The recess flanges 532 generally form the recess 524, and are aligned with the wall flanges 531. While the wall flanges 531 have a panel shape, the recess flanges 532 are formed with a shape that is able to receive and accommodate the pole 324 of the bracket 320. Accordingly, the recess flanges 532 has an initial wide gap that narrows in a middle portion before opening up at a rounded end. As shown in FIG. 5, there are a number of the wall flanges 531 and the recess flanges 532, whose numbers are not limited to those shown.

FIG. 5 further shows the notch flanges 533, which extend downward from the notch 521, and which provide form and support for the notch 521. The tail 534 has a panel shape, and provides partial covering for an interior space of the body 520.

FIG. 6 is a cross sectional view of the adapter according an example embodiment of the invention, which clearly shows the back 523, the recess 524, the body wall 530, the recess flanges 532, the notch flanges 533, the tail 534, and a slit 535. Also shown is an inclined portion 512 of the head 510. In FIG.

6, the recess flanges 532, the notch flanges 533, and the tail 534 are aligned in the same direction, namely away from the back 523. Also, the slit 535 is disposed between the recess flanges 532 and the notch flanges 533.

FIG. 7 is a front perspective view of the adapter according to an example embodiment. FIG. 7 shows the inclined portion 512, connecting walls 541 between the head 510 and the body 520, a notch flange 542, apertures 543, and a back pommel 544. As shown in FIG. 7, the head 510, the inclined portion 512 and the notch flange 542 are connected in series, whereby the inclined portion 512 is angled less than the head 510 and the notch flange 542. In other words, the head 510 and the notch flange 542 have a relatively rapid rise while the inclined portion 512 has a relatively slow rise. The notch flange 543 and a top portion of the connecting walls are part of the pommel 522. The apertures 543 run between the connecting walls 541 and the notch flange 542. The back pommel 544 runs parallel to the pommel 521. Also, the notch flange 543 is connected to the notch flange 533.

FIGS. 8 and 9 show the bracket 320, the adapter 500, and the windshield wiper arm 100 in an attached configuration. In such a configuration, the cutout notch 322 in the bracket 320 and the notch 521 in the adapter 500 are aligned and nested to receive and accommodate the rod 111 of the windshield wiper arm 100. Accordingly, the rod 111 is fitted snugly in the notch 521 of the adapter 500, and between the pommel 522 and the back 523, and the cutout notches 322 of the bracket 320 further participates in accommodating the rod 111 of the windshield wiper arm 100. For example, the cutout notches 322 engage the rod 111 at opposites ends of the rod 111. Additionally, in the configuration shown in FIGS. 8 and 9, the extension plate 112 of the windshield wiper arm 100 extends across the top surface of the back 523, and the platelet 113 is contacted to a lateral side of the adapter 500. Accordingly, the adapter 500 is made to fit between the platelet 113 and the head portion 110.

The invention thus being described, it will be obvious that the same may be varied in many ways. For example, an upper surface of each side wall of the bracket may have a notch formed therein if necessary to accommodate various adapters. Such variations are not to be regarded as a departure from the spirit and scope of the invention, and all such modifications as would be obvious to one skilled in the art are intended to be included within the scope of the following claims.

What is claimed is:

1. An adapter for a windshield wiper assembly, the adapter comprising:
 a head having a sloping portion; and
 a body connected to the head, the body including a pommel that contacts the head, a notch formed in a top surface of the body adjacent the pommel, said notch open to the top surface and extending downward to form a substantially cylindrical profile, a back extending away from the notch, and a recess formed under the back,
 wherein the head is narrower in width than the body, and
 wherein the notch is located between the pommel and the recess such that the notch does not extend past the recess.

2. The adapter of claim 1, wherein the notch extends laterally from one side to an opposite side of the body, and is disposed between the pommel and the back.

3. The adapter of claim 2, wherein the notch intersects an axis that extends from the head to the body.

4. The adapter of claim 1, wherein the notch extends depth-wise from the top surface of the body to a middle portion of the body.

5. The adapter of claim 1, wherein the pommel extends laterally from the one side to the opposite side of the body.

6. The adapter of claim 5, wherein the pommel intersects an axis that extends from the head to the body.

7. The adapter of claim 1, wherein the pommel extends height-wise away from the body.

8. The adapter of claim 1, wherein the pommel extends parallel to the notch.

9. The adapter of claim 1, wherein a length of the pommel is the same as a length of the notch.

10. The adapter of claim 1, wherein the back includes an indentation or a flat surface.

11. The adapter of claim 1, wherein the recess extends laterally from one side to an opposite side of the body, and is disposed between an end of the back and the notch.

12. The adapter of claim 1, wherein the recess intersects an axis that extends from the head to the body.

13. The adapter of claim 1, the recess extends depth-wise from a bottom of the body to about a middle portion of the body.

14. The adapter of claim 13, wherein the recess is open to the bottom of the body.

15. The adapter of claim 1, wherein the recess is configured to receive a pole of a windshield wiper bracket.

16. The adapter of claim 1, wherein the adaptor is configured to be nested into a windshield wiper bracket.

17. The adapter of claim 16, wherein the notch is configured to receive a rod of a windshield wiper arm.

18. The adapter of claim 1, wherein the notch and the recess are offset on opposite sides of the adapter.

\* \* \* \* \*